US007497126B2

United States Patent
(12) United States Patent
Tojo et al.

(10) Patent No.: US 7,497,126 B2
(45) Date of Patent: Mar. 3, 2009

(54) PRESSURE SENSOR

(75) Inventors: Hirofumi Tojo, Tokyo (JP); Masayuki Yoneda, Tokyo (JP); Tomohisa Tokuda, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 12/035,539

(22) Filed: Feb. 22, 2008

(65) Prior Publication Data

US 2008/0202248 A1 Aug. 28, 2008

(30) Foreign Application Priority Data

Feb. 28, 2007 (JP) ............................ 2007-050844

(51) Int. Cl.
*G01L 9/06* (2006.01)

(52) U.S. Cl. ........................................................ 73/715

(58) Field of Classification Search .................... 73/715
See application file for complete search history.

(56) References Cited

U.S. PATENT DOCUMENTS 5,332,469 A * 7/1994 Mastrangelo .................. 216/2
2007/0113668 A1* 5/2007 McMonigal ................. 73/756
2007/0184624 A1* 8/2007 Mueller et al. .............. 438/303

FOREIGN PATENT DOCUMENTS

JP 06-85287 A 3/1994
JP 2000-171318 A 6/2000
JP 2002-277337 A 9/2002

* cited by examiner

*Primary Examiner*—Andre J Allen
(74) *Attorney, Agent, or Firm*—Darby & Darby P.C.

(57) ABSTRACT

In a pressure sensor comprising a diaphragm formed on a portion of a chip made of semiconductor material and that senses pressure on the diaphragm by electrically converting the displacement corresponding to that pressure, the provision of the diaphragm with an aspect ratio of at least a size such that the derivative of the characteristic curve of the allowable pressure resistance of the pressure sensor, defined by setting the aspect ratio obtained by dividing the length of one side of the diaphragm by the thickness of the diaphragm as the horizontal axis and by setting the allowable pressure resistance of the pressure sensor as the vertical axis, becomes nearly zero, enables a pressure sensor having high sensitivity and high pressure resistance.

4 Claims, 3 Drawing Sheets

PRESSURE SENSOR

CROSS REFERENCE TO RELATED APPLICATIONS

The present application claims priority under 35 U.S.C. §119 to Japanese Patent Application No. 2007-050844, filed Feb. 28, 2007. The contents of the application is incorporated herein by reference in its entireties.

TECHNICAL FIELD

The present invention relates to a pressure sensor suitable for measuring absolute pressure, gauge pressure and differential pressure.

BACKGROUND OF THE INVENTION

For example, a pressure sensor that is widely used is comprised of a diaphragm formed over a portion of a semiconductor chip and a piezoresistive element arranged in a bridge shape on the diaphragm, and pressure on a medium to be measured is sensed by converting the displacement of the diaphragm, corresponding to the pressure on the medium to be measured, into a change in resistance of the piezoresistive element (see Japanese Unexamined Patent Application Publication No. 2002-277337 (page 2, FIG. 2), for example).

Moreover, inventions relating to a process for manufacturing pressure sensors by forming a diaphragm on a semiconductor chip while rigorously controlling the thickness of this type of diaphragm are also known (see Japanese Unexamined Patent Application Publication No. 2000-171318 (pages 3-4, FIG. 1), for example).

Silicon has typically been used as the semiconductor chip material for pressure sensors, but in considering a semiconductor material such as silicon in its agglomerate state, the physical properties of this semiconductor material, i.e., the degree of deformation (strain) in response to an external force, namely, the stress-strain characteristic, exhibits near linearity, and almost no non-linearity. In other words, this physical property arises when the semiconductor material is considered to be in its agglomerate state. However, in the case where silicon or other semiconductor material, having been controlled precisely in a crystalline state, is processed to become thinner beyond a certain extent, that there will be an increase in non-linearity is understood qualitatively.

However, this attribute of increased non-linearity is only known in a qualitative sense, and in a pressure sensor comprised of a diaphragm formed over a portion of a chip comprised from this type of semiconductor material, wherein pressure is sensed by electrically converting the displacement that corresponds to a pressure acting on the diaphragm, the specific range of dimensions within which to reduce the thickness of the diaphragm so as to satisfy divergent requirements for expanding the non-linear range of the stress-strain characteristic and providing high sensitivity with high pressure resistance is still unclear.

In other words, in a pressure sensor chip having a pressure-sensitive diaphragm portion, the stress generated at the diaphragm constitutes the sensor sensitivity, and therefore, in order to provide the pressure sensor with high sensitivity and high pressure resistance, the dimensional parameters of the pressure sensor diaphragm must be controlled specially to expand the non-linear region to the extent possible so as to satisfy the divergent requirements. By specifically discovering these types of dimensional parameters, it was hoped that the divergent requirements for high sensitivity and high pressure resistance could be satisfied and that the limiting range of pressure sensors could be expanded.

An object of the present invention is to provide a pressure sensor that has high sensitivity and high pressure resistance.

SUMMARY OF THE INVENTION

The pressure sensor of the present invention includes a diaphragm formed on a portion of a chip made of semiconductor material and sensing pressure acting on the diaphragm by electrically converting the displacement corresponding to that pressure, wherein:

the diaphragm is provided with an aspect ratio such that the derivative of the characteristic curve of the allowable pressure resistance of the pressure sensor, defined by setting the aspect ratio obtained by dividing the length of one side of the diaphragm by the thickness of the diaphragm as the horizontal axis, and by setting the allowable pressure resistance of the pressure sensor as the vertical axis, becomes nearly zero.

The use of a pressure sensor equipped with a semiconductor diaphragm having a construction within this type of dimensional range expands the non-linear region of the stress-strain characteristic generated concurrent with deformation of the diaphragm according to pressure acting on the diaphragm, and the utilization of this non-linear region advantageously for pressure measurement enables the pressure sensor to have high sensitivity and high pressure resistance.

The pressure sensor of the present invention is also embodied, wherein:

the diaphragm has a square shape as viewed from the side on which the pressure acts. When forming a square-shaped diaphragm via anisotropic etching, for example, a non-linear region will not appear in the stress-strain characteristic unless the diaphragm is made thinner than in the case when forming a circular-shaped diaphragm via isotropic etching, for example. Consequently, thickness of the diaphragm must be reduced in order to utilize this non-linear region. Reducing the thickness of the diaphragm, however, makes a square-shaped diaphragm particularly susceptible to concentrations of stress. Thus, the use of a pressure sensor equipped with a square-shaped semiconductor diaphragm having a construction within the type of dimensional range of the present invention expands the non-linear region of the stress-strain characteristic generated concurrent with deformation of the diaphragm according to pressure acting on the semiconductor diaphragm, enabling the non-linear region to be utilized advantageously for pressure measurement, and the pressure sensor to have high sensitivity and high pressure resistance.

Further, the pressure sensor diaphragm is formed from monocrystalline silicon. In the case where monocrystalline silicon, which in particular does not deform plastically in an agglomerate state and has no non-linearity associated with its stress-strain characteristic, is used as the semiconductor chip material, if a diaphragm of a certain thickness if formed, the diaphragm will breakdown within the linear region associated with the stress-strain characteristic and will not reach an intrinsic yield point. But by configuring the diaphragm with the type of dimensional relationship as in the present invention, non-linearity associated with the stress-strain characteristic can be generated proactively, and a pressure sensor that satisfies the divergent requirements for high sensitivity and high pressure resistance can be realized.

For any of the pressure sensors cited above the diaphragm has a thickness of not more than 15 μm and an aspect ratio of at least 135. By limiting the diaphragm dimensions especially as described herein, the non-linear region of the diaphragm stress-strain characteristic can be utilized reliably, and a pressure sensor that satisfies the divergent requirements of high sensitivity and high pressure resistance can be realized.

With the present invention, expansion of the non-linear region of the stress-strain characteristic generated concurrent with deformation of the diaphragm according to pressure acting on the semiconductor diaphragm is possible, this non-linear region can be used advantageously for pressure measurement, and the pressure sensor can be provided with high sensitivity and high pressure resistance.

DETAILED DESCRIPTION OF THE INVENTION

Figure 1:
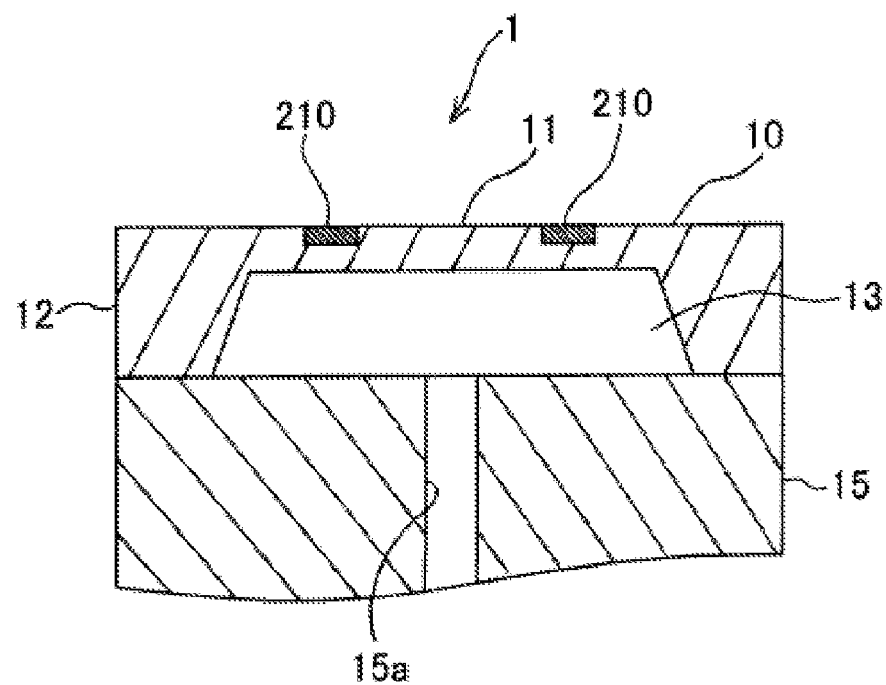
FIG. 1 is a cross-sectional view showing a simplified configuration of a pressure sensor in an embodiment of the present invention.
Figure 2:
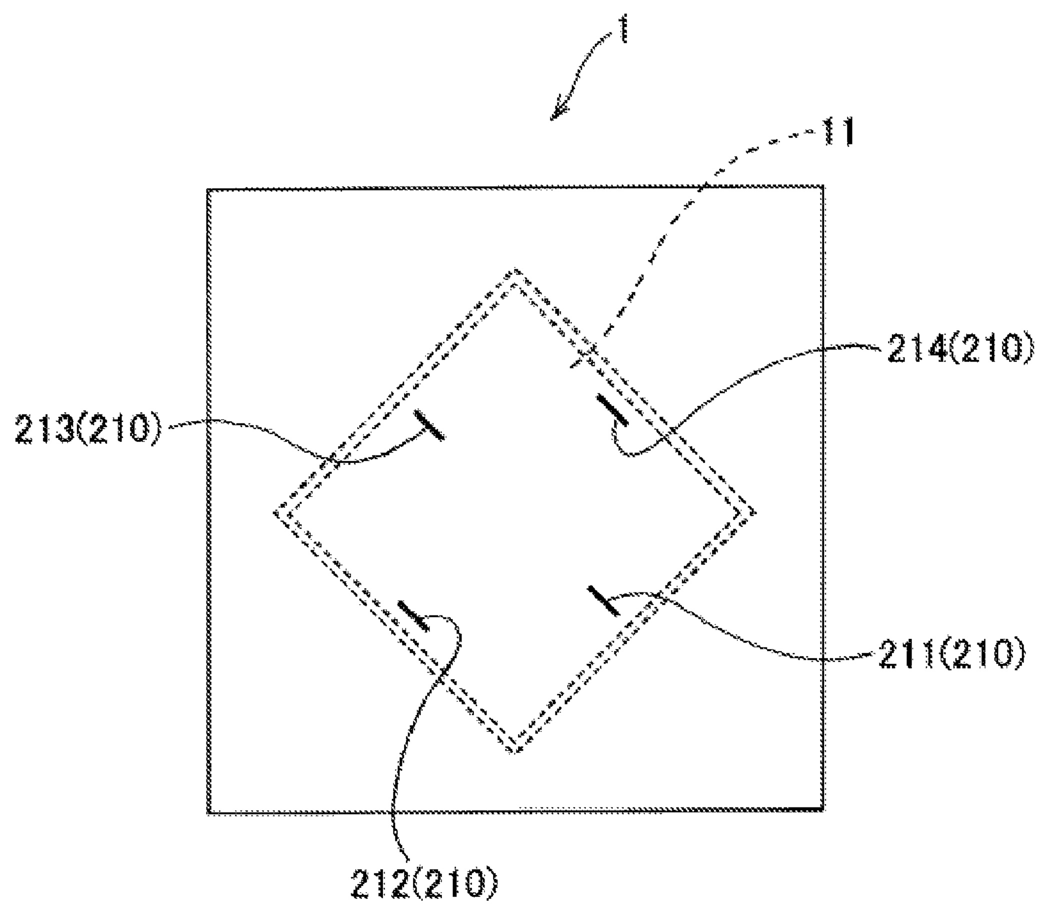
FIG. 2 is a plan view of the pressure sensor shown in FIG. 1.

A pressure sensor 1 of an embodiment of the present invention has a square-shaped sensor chip 10 comprised of monocrystalline silicon having a (100) crystal plane orientation, as is shown in FIGS. 1 and 2. Furthermore, in the description of this embodiment, only "pressure" terminology is used, but needless to say, the case in which different pressures are applied to both surfaces of the diaphragm and the differential pressure is measured is also included in these embodiments. Moreover, the present invention is not limited to sensor chips comprised of silicon having a (100) crystal plane orientation, and is also applicable to sensor chips comprised of silicon having a (110) crystal plane orientation.

The sensor chip 10 is comprised of a square-shaped diaphragm 11 formed at a predetermined location on the chip surface and a thick-walled portion 12 forming the outer periphery of the sensor chip 10 and surrounding the diaphragm 11. Then, a square-shaped recessed portion 13 is formed at the center of the rear face of the sensor chip 10 according to the formation of the diaphragm 11, and the thick-walled portion 12 is anodically bonded to a pedestal 15. Using Pyrex™ glass, ceramic material or the like, the pedestal 15 is formed into a prismatic body having approximately the same size as the sensor chip 10. Moreover, in the pedestal 15, a pressure conducting path 15*a* that guides the pressure on the medium to be measured is formed on the rear side of the diaphragm 11.

The diaphragm 11 is formed at an angle of approximately 45° with respect to the sensor chip 10 so that the edge of the diaphragm 11 is perpendicular to the diagonal of the sensor chip 10 in the plan view shown in FIG. 2 (see the edge of the diaphragm shown as a dotted line in FIG. 2). Then, in the vicinity of the peripheral edges of the diaphragm front face, four sensor gauges 210 (211 to 214) for sensing pressure and acting as a piezo region are formed at locations parallel to the diagonal lines of the sensor chip 10. Namely, these sensor gauges 211 to 214 are formed on the (100) face of the sensor chip 10 in the <110> orientation, at which the piezoresistance coefficient becomes a maximum.

These types of sensor gauges 210 (211 to 214) are formed by a diffusion method or an ion implantation method, and are coupled with leads (not shown) so as to configure a Wheatstone bridge circuit. When different pressures are applied to the front and rear faces of the diaphragm 11, the resistance of each sensor gauge 210 changes concurrent with the deformation of the diaphragm 11 corresponding to the pressure difference, and a pressure difference signal is output differentially in order to obtain the measured pressure.

Furthermore, in the case of the present embodiment, the sensor chip 10 of the pressure sensor 1 is a square having a length of 4.0 mm and a thickness of approximately 250 μm, as viewed from the direction in which the pressure acts, and the diaphragm 11 is a square having a length of 2.0 mm and a thickness of approximately 13 μm, also as viewed from the direction in which the pressure acts. Namely, the sensor chip 10 of the pressure sensor 1 of the present embodiment is formed from monocrystalline silicon semiconductor material, and the diaphragm 11 has a thickness of less than 15 μm and an aspect ratio, obtained by dividing the length of one side of the diaphragm 11 by the thickness of the diaphragm 11, of at least 135.

Thus, the diaphragm 11 of the pressure sensor 1 of the present embodiment provides a diaphragm having an aspect ratio such that the derivative of the characteristic curve of the allowable pressure resistance of the pressure sensor 1, defined by setting the aforementioned aspect ratio as the horizontal axis and the allowable pressure resistance of the pressure sensor 1 as the vertical axis (to be described in detail later), becomes nearly zero.

Furthermore, since the manufacturing process for the pressure sensor 1 having the above-described configuration is known as is disclosed in Japanese Unexamined Patent Application Publication No. H6-85287, for example, and the manufacturing process for accurately controlling the thickness of the diaphragm 11 is also known as is disclosed in Japanese Unexamined Patent Application Publication No. 2000-171318, a detailed explanation of the manufacturing process is omitted herein. Moreover, the sensor chip of the pressure sensor disclosed in Japanese Unexamined Patent Application Publication No. 2000-171318 has a configuration in which a silicon dioxide layer is interposed between two silicon layers, and although this type of silicon dioxide layer is not depicted in FIG. 1 which shows the present invention, that figure is a simplified schematic diagram drawn in order to facilitate an understanding of the present invention, and needless to say, a configuration having the silicon dioxide layer disclosed in the aforementioned publication is also included in the scope of the present invention.

By using the pressure sensor 1 configured as described above, a pressure sensor can be realized having high sensitivity with a span voltage of 5.0 KPa (60 mV) and having high pressure resistance of 350 kPa. This is the result of the advantageous utilization of the non-linear region of the diaphragm 11 stress-strain characteristic shown in FIG. 4, and of forming the semiconductor chip from monocrystalline silicon and providing the diaphragm 11 with the above-described dimensions and shape.

As with the present invention, in order to provide a pressure sensor that satisfies the divergent requirements for high sensitivity and high pressure resistance, there is no need to limit the material properties of the sensor chip 10 and the dimensional relationship of the diaphragm 11 as in the above-described embodiment, and all that is required is that the diaphragm has an aspect ratio such that the derivative of the characteristic curve of the allowable pressure resistance of the pressure sensor, defined by setting the aspect ratio obtained by dividing the length of one side of the diaphragm formed on a portion of the sensor chip by the diaphragm thickness as the horizontal axis and by setting the allowable pressure resistance of the pressure sensor as the vertical axis, becomes nearly zero. Moreover, by manufacturing the diaphragm via anisotropic etching, the diaphragm is not limited to having a square shape as viewed from the direction in which the pressure acts, and by manufacturing the diaphragm via isotropic etching, the present invention may also be applied to a diaphragm having a circular shape.

However, in order to exhibit the above-described action sufficiently in the present invention, the diaphragm should preferably have a square shape as viewed from the side on which the pressure acts, be formed from monocrystalline silicon, and have a thickness of less than 15 μm and an aspect ratio of 135 or higher.

The reason why the diaphragm preferably has a square shape, as viewed from the side on which the pressure acts, is because when the diaphragm has a square shape as a result of being formed via anisotropic etching, a non-linear region will not appear unless the diaphragm is made thinner than in the case where the diaphragm is formed in a circular shape via isotropic etching, for example, and therefore the diaphragm thickness must be reduced in order to utilize this non-linear region. Reducing the thickness of the diaphragm, however, makes a square-shaped diaphragm particularly susceptible to concentrations of stress. Consequently, the use of a pressure sensor equipped with a square-shaped semiconductor diaphragm having a construction within the type of dimensional range of the present invention expands the non-linear region of the stress-strain characteristic generated concurrent with deformation of the diaphragm according to pressure acting on the semiconductor diaphragm, enabling the non-linear region to be utilized advantageously for pressure measurement, and the pressure sensor to be provided with high sensitivity and high pressure resistance.

Moreover, the reason why the diaphragm is preferably formed with monocrystalline silicon is because in the case where monocrystalline silicon, which in particular does not deform plastically in its agglomerate state and has no non-linearity associated with its stress-strain characteristic, is used as the semiconductor chip material and a diaphragm having a certain thickness is formed, the diaphragm will breakdown within the linear region associated with the stress-strain characteristic and will not reach an intrinsic yield point. But by configuring the diaphragm with the type of dimensional relationship as in the present invention, non-linearity associated with the stress-strain characteristic can be generated proactively, and a pressure sensor that satisfies the divergent requirements for high sensitivity and high pressure resistance can be realized.

Moreover, regarding the reasons as to why the diaphragm preferably has a thickness of less than 15 μm and an aspect ratio of 135 or more, the inventors of the present invention have actually conducted supporting experiments, and the results thereof are described below.

Using pressure sensors formed from monocrystalline silicon and equipped with diaphragms of various thicknesses having been manufactured using the above-described general semiconductor process, experiments were conducted to investigate the output characteristics and diaphragm stress-strain characteristics in response to pressure on each pressure sensor. Furthermore, the dimensional relationship of each pressure sensor, the size and thickness of the semiconductor chip, and the length of a side of the diaphragm are equivalent to the dimensional relationships of the above-described embodiment. Thus, various pressure sensors were manufactured by controlling the aspect ratio obtained by dividing the length of one side of the diaphragm by the diaphragm thickness so as to obtain specific aspect ratios.

Namely, during the experiments, the aspect ratio was changed by fixing the length of one side the diaphragm and changing the thickness of the diaphragm. Then, using pressure sensors equipped with diaphragms of various thicknesses and different aspect ratios, the output as indicated by the span voltage (kPa(mV)) which shows the sensitivity of each pressure sensor and the pressure acting on the diaphragm, i.e., the pressure resistance (kPa), were measured.

Figure 3:
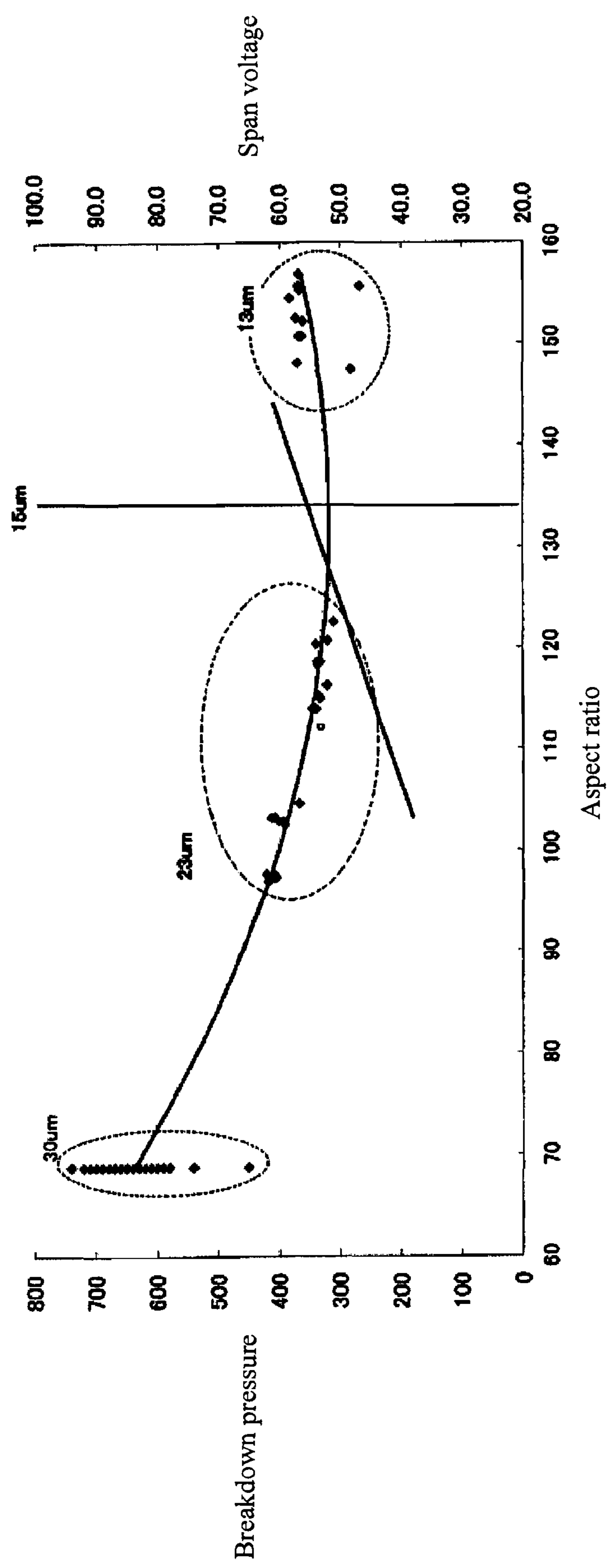
FIG. 3 is a characteristics chart showing the output characteristics and pressure resistance characteristics for a pressure sensor in an embodiment of the present invention; the horizontal axis indicates the aspect ratio of the diaphragm, the left-side vertical axis indicates the pressure resistance (kPa) of the pressure sensor, and the right-side vertical axis indicates the pressure sensor sensitivity as span voltage (mV).

FIG. 3 shows the measured results and is an output characteristics chart of the pressure sensor. The horizontal axis indicates the aspect ratio of the diaphragm, the left-side vertical axis indicates the pressure resistance (kPa) of the pressure sensor, and the right-side vertical axis indicates the pressure sensor sensitivity as output voltage (mV).

The multiple data plots shown in this characteristics chart show the results of actual measurements of pressure resistance corresponding to various aspect ratios of the pressure sensor. The multiple plots aligned vertically on the left side of the chart show measurement results of a pressure sensor equipped with a 30 μm-thick diaphragm, the multiple plots dispersed widely in the center of the chart show measurement results of a pressure sensor equipped with a 23 μm-thick diaphragm, and the multiple plots dispersed narrowly on the right side of the chart show measurement results of a pressure sensor equipped with a 13 μm-thick diaphragm.

The curve in FIG. 3, descending in the direction toward the right side of the chart and reaching a minimum value (where the derivative is nearly zero) in the vicinity of a diaphragm thickness of approximately 15 μm and an aspect ratio of approximately 135, shows the pressure resistance characteristics of the pressure sensor corresponding to the aspect ratio of the diaphragm and was obtained based on the measurement results. Meanwhile, the straight line rising in the direction toward the right upper portion of the chart is the output characteristic and shows the pressure sensor sensitivity obtained by measuring the aforementioned output voltage corresponding to various aspect ratios of the pressure sensor.

Inherently, in the aforementioned pressure resistance and output characteristics, the pressure resistance should decrease as the output voltage of the pressure sensor increases, but by using a pressure sensor having dimensions as in this experiment and by controlling the aspect ratio, as is evident from the output characteristics chart, the point at which the derivative of the characteristic curve of the allowable pressure resistance of the pressure sensor becomes nearly zero (reaches a minimum value) can be generated proactively, and these measurement results demonstrate that, particularly for a pressure sensor having a diaphragm with an aspect ratio of at least 135 and a diaphragm thickness of less than 15 μm, i.e., the pressure sensor in this embodiment described above, the pressure sensor will satisfy the divergent requirements for high sensitivity and high pressure resistance.

Figure 4:
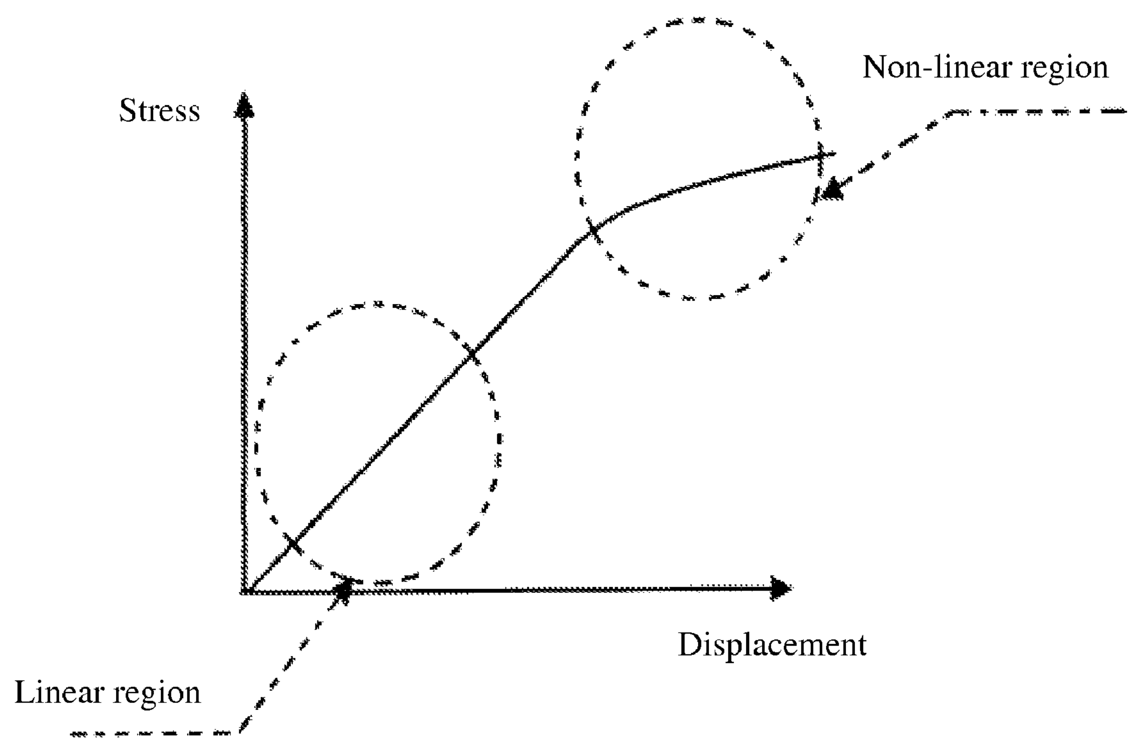
FIG. 4 is a drawing showing the stress-strain characteristic of a pressure sensor in an embodiment of the present invention.

By using a pressure sensor equipped with a semiconductor diaphragm having a construction within this type of dimensional range, the non-linear region of the stress-strain characteristic generated concurrent with deformation of the diaphragm according to pressure acting on the semiconductor diaphragm expands as shown in FIG. 4, and by utilizing this non-linear region advantageously for pressure measurement, the divergent requirements for high sensitivity and high pressure resistance of a pressure sensor are thought to be satisfied.

As has been described above, it has been found that the use of a pressure sensor equipped with a semiconductor diaphragm having a construction within the type of dimensional range of the present invention enables the non-linear region of the stress-strain characteristic generated concurrent with deformation of the diaphragm according to pressure acting on the semiconductor diaphragm to expand as shown in FIG. 4, and the utilization of the non-linear region advantageously for pressure measurement enables the provision of a pressure sensor having high sensitivity and high pressure resistance.

In this case, a pressure sensor diaphragm having a square shape, as viewed from the side on which the pressure acts, was found to be especially preferable. This is because, in the case in which the diaphragm is formed in a square shape via anisotropic etching, for example, a non-linear region will not appear unless the diaphragm thickness is reduced to less than that in the case where the diaphragm has a circular shape as a result of being formed via anisotropic etching, for example, and therefore the diaphragm thickness must be reduced in order to utilize this non-linear region. Reducing the thickness of the diaphragm, however, makes a square-shaped diaphragm particularly susceptible to concentrations of stress. Consequently, the use of a pressure sensor equipped with a square-shaped semiconductor diaphragm having a construction within the type of dimensional range of the present invention is thought to expand the non-linear region of the stress-strain characteristic generated concurrent with deformation of the diaphragm according to pressure acting on the semiconductor diaphragm, enable the non-linear region to be utilized advantageously for pressure measurement, and to result in a pressure sensor having high sensitivity and high pressure resistance.

Moreover, in this case, a diaphragm formed from monocrystalline silicon was found to be especially preferable. This is because, in the case where monocrystalline silicon, which in particular does not deform plastically in its agglomerate state and has no non-linearity associated with its stress-strain characteristic, is used as the semiconductor chip material and the diaphragm is formed, a diaphragm of a certain thickness will breakdown within the linear region associated with the stress-strain characteristic and will not reach an intrinsic yield point. But by configuring the diaphragm with the type of dimensional relationship as in the present invention, as shown in FIG. 4, it is thought that non-linearity associated with the stress-strain characteristic can be generated proactively, and a pressure sensor that satisfies the divergent requirements for high sensitivity and high pressure resistance can be realized.

Moreover, in this case, a diaphragm thickness of less than 15 μm and an aspect ratio of at least 135 were found to be especially preferable. This is because by limiting the diaphragm dimensions especially as described herein, it is thought that the non-linear region of the diaphragm stress-strain characteristic can be utilized reliably, and a pressure sensor that satisfies the divergent requirements of high sensitivity and high pressure resistance can be realized.

What we claim:

1. A pressure sensor comprising a diaphragm formed on a portion of a chip made of semiconductor material and sensing pressure acting on the diaphragm by electrically converting the displacement corresponding to that pressure, wherein:

the diaphragm is provided with an aspect ratio of at least a size such that the derivative of the characteristic curve of the allowable pressure resistance of the pressure sensor, defined by setting the aspect ratio obtained by dividing the length of one side of the diaphragm by the thickness of the diaphragm as the horizontal axis and by setting the allowable pressure resistance of the pressure sensor as the vertical axis, becomes nearly zero.

2. The pressure sensor cited in claim 1, wherein the diaphragm has a square shape as viewed from the side on which the pressure acts.

3. The pressure sensor cited in claim 1, wherein the diaphragm is formed from monocrystalline silicon.

4. The pressure sensor as cited in claim 1, wherein the diaphragm has a thickness of not more than 15 μm and the aspect ratio of at least 135.

* * * * *